(12) United States Patent
Park et al.

(10) Patent No.: US 12,405,592 B2
(45) Date of Patent: Sep. 2, 2025

(54) PLANT MONITORING METHOD USING EXERGY EFFICIENCY VALUE

(71) Applicant: DOOSAN ENERBILITY CO., LTD., Changwon-si (KR)

(72) Inventors: Jung Won Park, Seoul (KR); Jung June Lee, Incheon (KR); Yeong Hyeok Kim, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 1100 days.

(21) Appl. No.: 16/553,164

(22) Filed: Aug. 27, 2019

(65) Prior Publication Data

US 2020/0073364 A1 Mar. 5, 2020

(30) Foreign Application Priority Data

Sep. 5, 2018 (KR) ........................ 10-2018-0105944

(51) Int. Cl.
*G05B 19/4063* (2006.01)
*G05B 23/02* (2006.01)
*G05B 13/02* (2006.01)

(52) U.S. Cl.
CPC ..... *G05B 19/4063* (2013.01); *G05B 23/0283* (2013.01); *G05B 13/0205* (2013.01);
(Continued)

(58) Field of Classification Search
CPC ............ G05B 19/4063; G05B 23/0283; G05B 2219/39407
(Continued)

(56) References Cited

U.S. PATENT DOCUMENTS 5,311,562 A * 5/1994 Palusamy ............... G21C 17/00
60/660
6,768,970 B2 * 7/2004 Shimizu ............. G05B 23/0264
700/287
(Continued)

FOREIGN PATENT DOCUMENTS

DE 102011108327 A1 1/2013
JP 2014035687 A 2/2014
(Continued)

OTHER PUBLICATIONS

Hermann et al. (Quantifying global exergy resources Global Climate and Energy Project, 556Q Peterson Laboratory, Stanford University, 416 Escondido Mall, Stanford, CA 94305, USA Received Apr. 2, 2005) (Year: 2005).*
(Continued)

*Primary Examiner* — Paul D Lee
(74) *Attorney, Agent, or Firm* — Harvest IP Law, LLP

(57) ABSTRACT

A plant monitoring method using exergy efficiency is provided. The plant monitoring method includes detecting data associated with chemical exergy and physical exergy of each apparatus or subsystem and obtaining a chemical exergy value and a physical exergy value of each apparatus or subsystem, calculating an exergy efficiency value of each apparatus or subsystem on the basis of the detected data, and identifying a maintenance target which refers to an apparatus or subsystem that needs to be improved in efficiency on the basis of data obtained through the calculating of the exergy efficiency value.

15 Claims, 11 Drawing Sheets

(52) U.S. Cl.
CPC ...... *G05B 23/0221* (2013.01); *G05B 23/0235* (2013.01); *G05B 2219/39407* (2013.01)

(58) Field of Classification Search
USPC .......................................................... 702/184
See application file for complete search history.

(56) References Cited

U.S. PATENT DOCUMENTS

| | | | | |
|---|---|---|---|---|
| 10,577,269 | B1* | 3/2020 | Bader | C02F 1/004 |
| 2006/0034755 | A1* | 2/2006 | Wegeng | C01B 3/501 |
| | | | | 423/650 |
| 2013/0073098 | A1* | 3/2013 | Gan | H02J 3/381 |
| | | | | 700/286 |
| 2014/0116063 | A1* | 5/2014 | Deng | F01K 7/38 |
| | | | | 60/39.461 |
| 2017/0148114 | A1* | 5/2017 | Liptsey-Rahe | G06Q 50/06 |
| 2018/0046154 | A1* | 2/2018 | Kondo | G05B 17/02 |
| 2018/0260271 | A1* | 9/2018 | Lee | G06F 11/008 |
| 2018/0373234 | A1* | 12/2018 | Khalate | G06N 5/045 |
| 2019/0161366 | A1* | 5/2019 | Al-Azazmeh | B01D 3/007 |
| 2019/0240592 | A1* | 8/2019 | Antar | B01D 1/04 |
| 2024/0116063 | A1 | 4/2024 | Smith | |

FOREIGN PATENT DOCUMENTS

| | | | |
|---|---|---|---|
| KR | 101065767 B1 | 9/2011 | |
| KR | 101396987 B1 | 5/2014 | |
| KR | 10-2017-0121536 A | 11/2017 | |
| WO | WO-2007028158 A2 * | 3/2007 | G06F 17/50 |
| WO | 2013014058 A1 | 1/2013 | |

OTHER PUBLICATIONS

DE OA dated Jun. 3, 3034.
A Practical Application of the Exergy Analysis Method, Korean Society for Energy, Nov. 1998, 236-241(6 pages).
Office Action, Zeller, Markus, Office Action for DE 102011108327 A1, German Patent and Trademark Office, Dec. 15, 2020.

* cited by examiner

FIG. 2

Related Art

Table 2

Thermodynamic parameters and results for the operation of the ten lines.

| Line | V<br>m³/h | $P_1$<br>bar | $P_2$<br>bar | $V_{per.1}$<br>m³/h | $V_{per.2}$<br>m³/h | $V_{per.tot}$<br>m³/h | $TDS_{per.tot}$<br>ppm | $Cf_1$<br>% | $Cf_2$<br>% | $Cf_{tot}$<br>% | c<br>kWh/m³ |
|---|---|---|---|---|---|---|---|---|---|---|---|
| A (1) | 785 | 47.8 | 69.5 | 79 | 318 | 397 | 240 | 20.4 | 45.1 | 50.6 | 2.29 |
| B (2) | 642 | 61.6 | 59.9 | 254 | 62 | 316 | 288 | 41.1 | 16.4 | 49.2 | 3.75 |
| C (3) | 683 | 62.3 | 70.5 | 246 | 101 | 347 | 298 | 36.0 | 23.1 | 50.8 | 4.03 |
| E (4) | 759 | 67.9 | 71.7 | 335 | 114 | 449 | 448 | 44.1 | 26.9 | 59.2 | 3.49 |
| F-G (5-6) | 1229 | 61.0 | 67.0 | 450 | 200 | 650 | 354 | 34.6 | 23.6 | 50.0 | 3.15 |
| H (7) | 793 | 70.5 | 73.1 | 301 | 119 | 420 | 394 | 38.0 | 24.2 | 53.0 | 3.64 |
| I (8) | 661 | 54.2 | 79.1 | 187 | 135 | 322 | 465 | 28.3 | 28.5 | 48.7 | 4.12 |
| K-L (9-10) | 1227 | 63.0 | 70.5 | 461 | 157 | 618 | 269 | 37.6 | 20.5 | 50.4 | 4.57 |
| Total | 6849 | | | 2313 | 1206 | 3519 | 427 | | | | 3.55 |

FIG. 7

$$\eta_{II} = \sum \dot{E}_{out} / \sum \dot{E}_{in}$$

$$W_{min,theory} = -(\sum \dot{E}_{in} - \sum \dot{E}_{out})$$

$$W_{min,process} = -\sum_i \sum_j \dot{E}_{f,j} \qquad \text{for } \forall i \text{ component where } \sum_j \dot{E}_{f,j} < 0$$

$$W_{actual} = -\sum_i (\sum_j \dot{E}_{f,j} / \eta_{i,device}) \quad \text{for } \forall i \text{ component where } \sum_j \dot{E}_{f,j} < 0$$

$$\eta_{II,process} = W_{min,theory}/W_{min,process} = w_{min,theory}/w_{min,process}$$

$$\eta_{II,actual} = W_{min,theory}/W_{actual} = w_{min,theory}/w_{actual}$$

$\Sigma \dot{E}_{in} = \dot{E}_1 + \dot{E}_4$ $\Sigma \dot{E}_{out} = \dot{E}_2 + \dot{E}_3$ ● Node point (1~4) for Design and/or O&M $\Sigma \dot{E}_{in} = \dot{E}_1 + \underline{\text{Electricity In}} = \dot{m}_1 e_{f,1} + \underline{\text{Electricity In}}$ $\Sigma \dot{E}_{out} = \dot{E}_2 = \dot{m}_2 e_{f,2}$ ● Node point (1,2) for Design and/or O&M

FIG. 10

Table 3

Exergetic efficiency, ε, of the main components of the RO desalination plant.

| Line | Intake pumps | Transfer pumps | HPP | Booster pumps | RO-1 | RO-2 | PES | Pelton turbines |
|---|---|---|---|---|---|---|---|---|
| A | 0.2060 | 0.2717 | 0.7860 | 0.6787 | 0.5353 | 0.6761 | 0.9856 | |
| B | | | 0.7715 | 0.6058 | 0.6092 | 0.7323 | | 0.7151 |
| C | | | 0.8306 | 0.6704 | 0.5566 | 0.6914 | | 0.5965 |
| E | | | 0.7320 | 0.4484 | 0.5581 | 0.8186 | 0.9501 | |
| F | | | 0.7504 | 0.5745 | 0.5760 | 0.7512 | 0.9421 | |
| G | | | | 0.9604 | 0.5474 | 0.8224 | 0.9074 | |
| H | | | 0.7324 | 0.3883 | 0.5076 | 0.7044 | 0.9725 | |
| I | 0.2393 | | 0.7651 | 0.8805 | 0.5886 | 0.6338 | | 0.6890 |
| K | 0.6015 | | 0.7574 | 0.7447 | 0.5807 | 0.7124 | | 0.4257 |
| L | | | | 0.7331 | 0.5704 | 0.7036 | | 0.4137 |

PLANT MONITORING METHOD USING EXERGY EFFICIENCY VALUE

CROSS REFERENCE TO RELATED APPLICATION

This application claims priority to Korean Patent Application No. 10-2018-0105944, filed on Sep. 5, 2018, the disclosure of which is incorporated herein by reference in its entirety.

BACKGROUND

1. Field

Apparatuses and methods consistent with exemplary embodiments relate to a plant monitoring method and, more particularly, to a plant monitoring method using exergy efficiency.

2. Description of the Related Art

Large plants such as power plants or chemical plants in which hundreds of machines and various kinds of electric equipment are connected complexly and are operated from a central control room which is generally called a main control room. The number of people working in the central control room is two to ten but is decreasing due to an improvement in corporate competitiveness and productivity.

In particular, the number of facilities to be managed per worker has increased dramatically in a case of thermal power plants where many workers worked in the past, because an operation and manipulation of plants are performed from a central panel while performed from local panels in the past. Recently, with the development of information technology, a computer-based man-machine interface (MMI) operation method has become common among plants.

Workers with experience in operation of plants are well aware of measures to be taken under a variety of circumstances and have knowledge pertaining to complex internal control logics for various facilities, thereby promptly taking proper measures to deal with troubles. However, unskilled workers have to consult with the relevant reference books such as operator's manual explaining how to perform operation procedures, design specifications provided by equipment suppliers, and other books, to deal with problematic situations. Therefore, an operation of plants by unskilled workers is vulnerable to accidents in the plants where quick and secure measures are required.

In addition, currently available operation consoles display only basic operation status information but do not provide guidance to various accidental situations.

Therefore, there is a need for a system having an operation support console that promptly provides appropriate information (e.g., proper guidance to deal with a specific accident) as well as an operation console for displaying operation status information.

For effective operation of plants, a related art operation system is organized into an expert system, a real-time performance monitoring system, and various monitoring devices. However, because a vast amount of information cannot be entirely displayed on a limited screen of the operation system, the related art operation system has a problem that information necessary for quickly responding to various troubles occurring in a plant cannot be sufficiently provided to operators.

FIG. 1 is a schematic diagram illustrating a related art plant in which two or more apparatuses and two or more subsystems constitute one system. FIG. 2 is a table of data of each facility acquired by a related art operation system. When a worker lacks sufficient skills and knowledge pertaining to facilities in a plant, the worker has difficulty in determining an operation efficiency of each facility from the data of FIG. 2.

Further, in the related art operation systems, it is not easy to determine whether the process design of a plant is optimized, it is difficult to accurately identify an equipment or a subsystem that needs to be improved, repaired, or maintained during operation of the plant, and it is difficult to detect troubles that gradually develop during operation of the plant.

Accordingly, a solution to the problems occurring in the related art is required.

SUMMARY

Aspects of one or more exemplary embodiments provide a plant monitoring method using exergy efficiency.

Additional aspects will be set forth in part in the description which follows and, in part, will become apparent from the description, or may be learned by practice of the exemplary embodiments.

According to an aspect of an exemplary embodiment, there is provided a method of monitoring operation of a plant in which two or more apparatuses or subsystems constitute one system by using exergy efficiency, the method including: detecting data associated with chemical exergy and physical exergy of each apparatus or subsystem and obtaining a chemical exergy value and a physical exergy value of each apparatus or each subsystem; calculating an exergy efficiency value of each apparatus or subsystem on the basis of the detected data; and identifying a maintenance target which is an apparatus or subsystem that needs to be improved in efficiency on the basis of the calculating of the exergy efficiency values.

The method may further include calculating a maintenance time at which each apparatus or subsystem is to be maintained on the basis of data obtained through the calculating of the exergy efficiency value.

The method may further include performing again each of the detecting data, the calculating of the exergy efficiency value, and the identifying of the maintenance target after performing maintenance on the apparatus or subsystem that is identified through the identifying of the maintenance target.

The method may further include outputting a plant diagnosis result to notify a plant operator of the identified apparatus or subsystem and sending a result of the calculated maintenance time at which each apparatus or subsystem is to be maintained to the plant operator.

The chemical exergy value is calculated by Equation 1, the physical exergy value is calculated by Equation 2, and a total exergy value is calculated by Equation 3, $$\sum_{i=1}^{n} y_i(\mu_i^* - \mu_i^0) \quad \text{Equation 1}$$

$$\frac{v^2}{2} + g(l - l^*) + (h - h^*) - T_0(s - s^*) \quad \text{Equation 2}$$

-continued $$\frac{v^2}{2} + g(l-l^*) + (h-h^*) - T_0(s-s^*) + \sum_{i=1}^{n} y_i(\mu_i^* - \mu_i^0) \quad \text{Equation 3}$$

where v is a flow velocity value, g is a gravitational acceleration value, l is a level value, h is a specific enthalpy value, s is a specific entropy value, y is a specific mass fraction value, and μ is a specific chemical potential value.

The chemical exergy value is calculated by Equation 4, the physical exergy value is calculated by Equation 5, and a standard chemical exergy value of the component k is calculated by Equation 6, $$E^{CH} = \Sigma x_k e_k^{CH} + \dot{R}T_0 \Sigma x_k \ln x_k \quad \text{Equation 4}$$

$$E^{PH} = (U-U_0) + p_0(V-V_0) - T_0(S-S_0) \quad \text{Equation 5}$$

$$e_k^{CH} = -\dot{R}T_0 \ln x^e_k \quad \text{Equation 6}$$

where U, V, and S are internal energy, volume, and entropy of a subsystem, respectively, a subscript of 0 represents a reference environment, $x_k$ is a molar fraction value of a component k, $\dot{R}$ is a gas constant, and $x^e_k$ is a molar fraction value of the reference environment.

The exergy efficiency value may be obtained by adding the chemical exergy value and the physical exergy value, and the chemical exergy value preferably may include a mixing exergy value.

In the calculating of the exergy efficiency value, if there is a stream for which electric and chemical energy is used or a stream from which electric and chemical energy is generated, the exergy efficiency value may be calculated taking into account data associated with the stream.

In the calculating of the exergy efficiency value calculation step, the exergy efficiency value may be expressed in terms of a value within a range of 0 to 1, a value within a range of 0 to 10, or a value within a range of 0 to 100.

The identifying of the maintenance target may include detecting an apparatus or subsystem having a data value that is out of a predetermine normal range and determining the detected apparatus or subsystem as a maintenance target and determining the detected apparatus or subsystem as a maintenance target, checking a maintenance priority of apparatuses or subsystems, and ordering the apparatuses or subsystems determined as the maintenance targets according to the maintenance priorities.

The calculating of the maintenance time may include storing data sorted by data and time, deriving an operation trend curve associated with operation efficiencies of the apparatuses or subsystems on the basis of the stored data, and deriving a maintenance time and a maintenance cycle on which each apparatus or subsystem needs to be maintained on the basis of the derived operation trend curve.

The detecting data, the calculating of the exergy efficiency value, and the identifying of the maintenance target are periodically performed on a predetermined cycle.

According to an aspect of another exemplary embodiment, there is provided a method of monitoring operation of a plant in which two or more apparatuses or subsystems constitute one system by using exergy efficiency, the method including: detecting data associated with chemical exergy and physical exergy of each apparatus or subsystem and obtaining a chemical exergy value and a physical exergy value of each apparatus or each subsystem; calculating an exergy efficiency value of each apparatus or subsystem on the basis of the detected data; identifying a maintenance target which is an apparatus or subsystem that needs to be improved in efficiency on the basis of the calculating of the exergy efficiency values; calculating a maintenance time at which each apparatus or subsystem needs to be maintained on the basis of the data obtained through the calculating of the exergy efficiency value; and performing again each of the detecting data, the calculating of the exergy efficiency value, and the identifying of the maintenance target after performing maintenance on the apparatus or subsystem that is identified through the identifying of the maintenance target.

The method may further include outputting a plant diagnosis result to notify a plant operator of the identified apparatus or subsystem and sending a result of the calculated maintenance time at which each apparatus or subsystem is to be maintained to the plant operator.

The exergy efficiency value may be obtained by adding the chemical exergy value and the physical exergy value, and the chemical exergy value may include a mixing exergy value.

In the calculating of the exergy efficiency value, if there is a stream for which electric and chemical energy is used or a stream from which electric and chemical energy is generated, the exergy efficiency value may be calculated taking into account data associated with the stream.

In the calculating of the exergy efficiency value, the exergy efficiency value may be expressed in terms of a value within a range of 0 to 1, a value within a range of 0 to 10, or a value within a range of 0 to 100.

The identifying of the maintenance target may include detecting an apparatus or subsystem having a data value that is out of a predetermine normal range and determining the detected apparatus or subsystem as a maintenance target and determining the detected apparatus or subsystem as a maintenance target, checking a maintenance priority of apparatuses or subsystems, and ordering the apparatuses or subsystems determined as the maintenance targets according to the maintenance priorities.

The calculating of the maintenance time may include storing data sorted by data and time, deriving an operation trend curve associated with operation efficiencies of the apparatuses or subsystems on the basis of the stored data, and deriving a maintenance time and a maintenance cycle on which each apparatus or subsystem needs to be maintained on the basis of the derived operation trend curve.

The detecting data, the calculating of the exergy efficiency value, and the identifying of the maintenance target are periodically performed on a predetermined cycle.

BRIEF DESCRIPTION OF THE DRAWINGS

FIG. 2 is a table showing data detected from each device and each sub-system constituting the plant of FIG. 1;

FIG. 7 is a diagram showing a basic formula for calculating an exergy efficiency value based on the physical exergy and the chemical exergy of FIG. 6;

FIG. 10 is a diagram comparing a related art data table and a data table according to an exemplary embodiment.

DETAILED DESCRIPTION

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well, unless the context clearly indicates otherwise. When an element is referred to as being "on" another element, it can be directly on the other element or intervening elements may be present therebetween.

In the disclosure, the terms such as "comprise", "include", "have/has" should be construed as designating that there are such features, regions, integers, steps, operations, elements, components, and/or combinations thereof, not to exclude the presence or possibility of adding of one or more of other features, regions, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Figure 1:
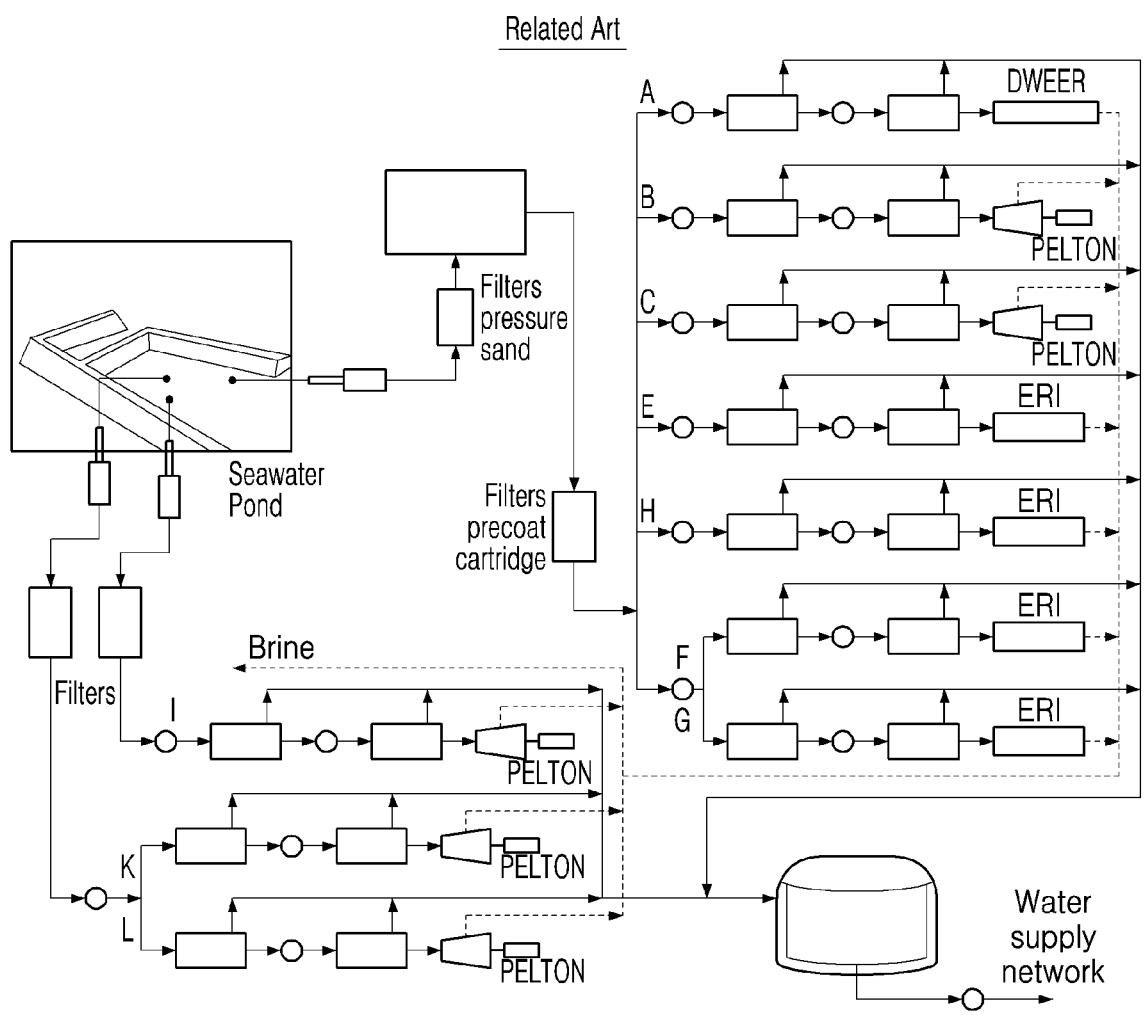
FIG. 1 is a schematic diagram illustrating a related art plant in which two or more devices and two or more subsystems constitute one system.
Figure 3:
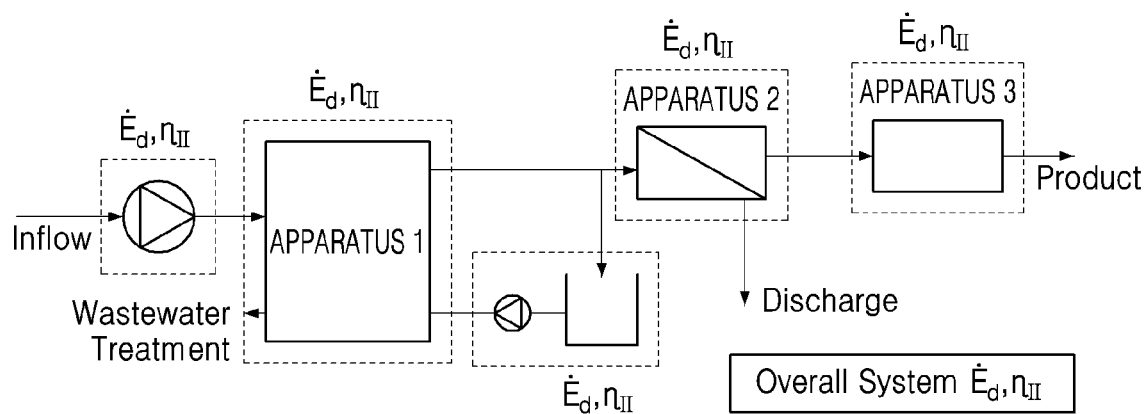
FIG. 3 is a configuration diagram illustrating a plant model operated according to a plant monitoring method according to an exemplary embodiment.
Figure 4:
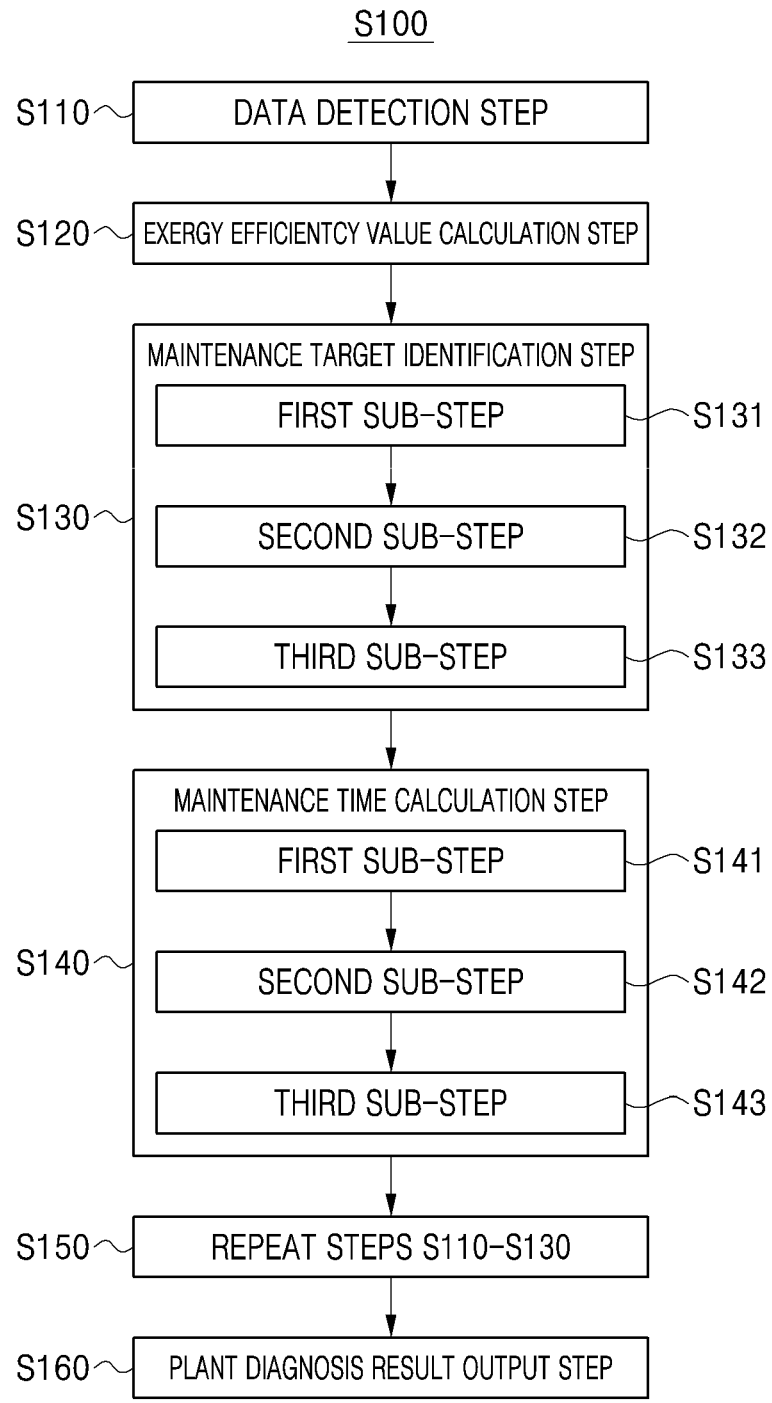
FIG. 4 is a flowchart illustrating a plant monitoring method according to an exemplary embodiment.
Figure 5:
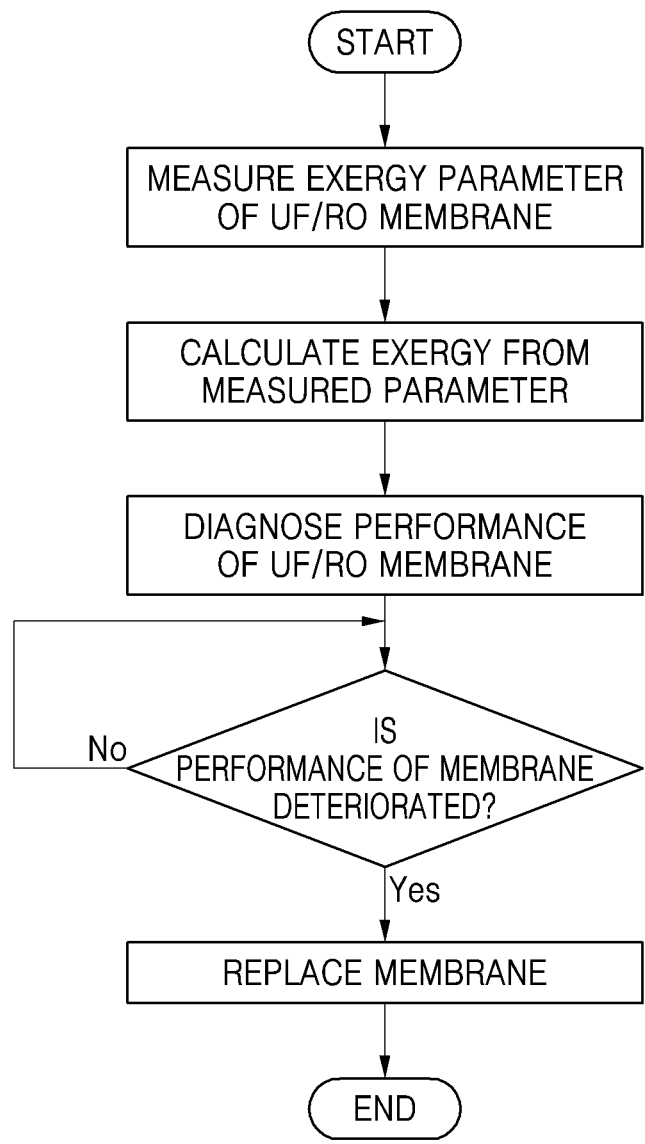
FIG. 5 is a flowchart illustrating a plant monitoring method according to an exemplary embodiment in a case in which the plant monitoring method is applied to an ultra-filtration/reverse-osmosis (UF/RO) water plant.

FIG. 3 is a block diagram illustrating a construction of a plant model operated by a plant monitoring method according to an exemplary embodiment, FIG. 4 is a flowchart illustrating a plant monitoring method according to an exemplary embodiment, and FIG. 5 is a flowchart illustrating a plant monitoring method according to an exemplary embodiment in a case in which the plant monitoring method is applied to an ultra-filtration/reverse-osmosis (UF/RO) water plant.

Referring to FIGS. 3 to 5, a plant monitoring method S100 of monitoring a plant in which two or more apparatuses or subsystems constitute a single system may include a data detection step S110, an exergy efficiency value calculation step S120, a maintenance target identification step S130, and a maintenance time calculation step S140.

The data detection step S110 is an operation of detecting data related to a chemical exergy and a physical exergy from each apparatus and each subsystem. Here, a chemical exergy value $E^{CH}$ and a physical exergy value $E^{PH}$ for each apparatus and each subsystem may be obtained on the basis of the detected data.

The data detection step S110 is preferably repeatedly performed on a regular cycle. The data collected through the data detection step may be averaged over a predetermined period of time and resulting values may be recorded as data in a recording medium. The recorded data may be used in subsequent steps. The period of time over which the data is averaged may vary depending on apparatus or subsystem. Also, it may vary depending on environmental conditions. For example, the period of time may be appropriately set according to a temperature, humidity, precipitation, snowfall, wind speed, and season in the area in which the apparatus or the subsystem is installed.

The exergy efficiency value calculation step S120 is an operation of calculating the exergy efficiency values $\eta_{II}$ of respective apparatuses and subsystems on the basis of the detected data.

Figure 6:
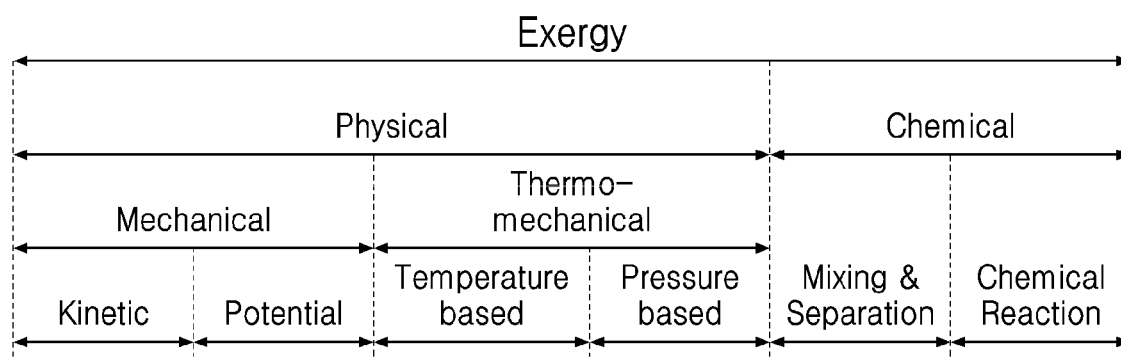
FIG. 6 is a diagram showing an example of chemical exergy and physical exergy.

FIG. 6 is a diagram illustrating an example of chemical exergy and physical exergy, and FIG. 7 shows basic equations for calculating the exergy efficiency values on the basis of the concept of FIG. 6.

Referring to FIGS. 6 and 7, the exergy values that can be obtained through the data detection step S110 include a chemical exergy value $E^{CH}$ and a physical exergy value $E^{PH}$. The chemical exergy value $E^{CH}$ is calculated by Equation 1, the physical exergy value $E^{PH}$ is calculated by Equation 2, and the total exergy value is calculated by Equation 3.

$$\sum_{i=1}^{n} y_i(\mu_i^* - \mu_i^0) \quad \text{Equation 1}$$

$$\frac{v^2}{2} + g(l - l^*) + (h - h^*) - T_0(s - s^*) \quad \text{Equation 2}$$

$$\frac{v^2}{2} + g(l - l^*) + (h - h^*) - T_0(s - s^*) + \sum_{i=1}^{n} y_i(\mu_i^* - \mu_i^0) \quad \text{Equation 3}$$

In these equations, v is a flow velocity value, g is a gravitational acceleration value, l is a level value, h is a specific enthalpy value, s is a specific entropy value, y is a specific mass fraction value, and μ is a specific chemical potential value.

In some cases, the chemical exergy value $E^{CH}$ may be calculated by Equation 4, the physical exergy value $E^{PH}$ may be calculated by Equation 5, and a standard chemical exergy value $e_k^{CH}$ of a component k may be calculated by Equation 6.

$$E^{CH} = \Sigma x_k e_k^{CH} + \dot{R}T_0 \Sigma x_k \ln x_k \quad \text{Equation 4}$$

$$E^{PH} = (U - U_0) + p_0(V - V_0) - T_0(S - S_0) \quad \text{Equation 5}$$

$$e_k^{CH} = -\dot{R}T_0 \ln x_k^e \quad \text{Equation 6}$$

In these equations, U, V, and S are internal energy of each system, volume, and entropy, respectively, a superscript of 0 denotes a reference environment, the component $x_k$ is a molar fraction value of a component k, $\dot{R}$ is a gas constant, and $x_k^e$ is a mole fraction value of the component k in the reference environment.

In this case, the exergy efficiency value $\eta_{II}$ is a sum of the chemical exergy value $E^{CH}$ and the physical exergy value $E^{PH}$, and the chemical exergy value $E^{CH}$ preferably includes a mixing exergy value.

Figure 8:
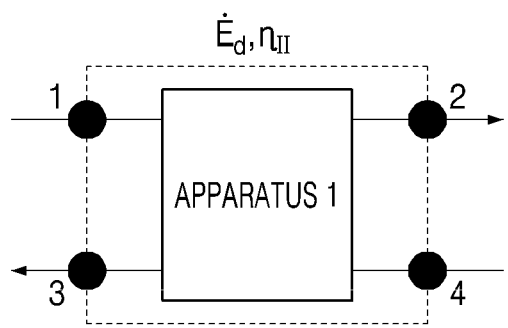
FIG. 8 is a schematic diagram illustrating a method of calculating an exergy value for an apparatus or a subsystem in which only a fluid flow exists.

FIG. 8 is a schematic diagram illustrating a method of calculating an exergy value of an apparatus or subsystem in which only a fluid flow exists.

Referring to FIG. 8, the exergy value of the apparatus or subsystem can be calculated from the total exergy that is input to the apparatus or subsystem and the total exergy that is output from the apparatus or subsystem.

Figure 9:
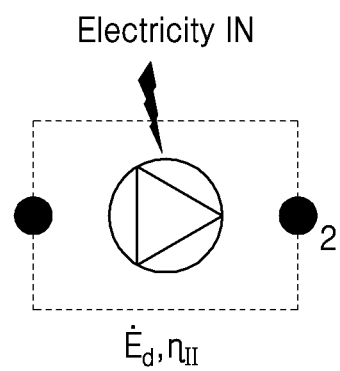
FIG. 9 is a schematic diagram illustrating a method of calculating an exergy value of an apparatus or a subsystem including a pump, a turbine and generator, a combustor, or a boiler.

FIG. 9 is a schematic diagram illustrating a method of calculating an exergy value of an apparatus or subsystem including a pump, a turbine and generator, a combustor, or a boiler.

Referring to FIGS. 8 and 9, in the exergy efficiency value calculation step S120, if there is a stream to which electric energy and chemical energy are input or a stream from which electrical energy and chemical energy are generated or output in addition to the flow applied to the plant, it is preferable to calculate the exergy efficiency value by reflecting data associated with the stream.

FIG. 10 is a table in which an efficiency of each apparatus or subsystem is represented in a form of a value within a range of 0 to 1 when the method according to the exemplary embodiment is used.

Referring to FIG. 10, it can be aware of the efficiency value for each factor in each apparatus or subsystem A to L. Therefore, it is possible even for workers who are not sufficiently experienced or do not have sufficient knowledge about facilities in the plant to understand the operation efficiency of each facility.

The maintenance target identification step S130 refers to an operation of identifying an apparatus or subsystem that needs to be improved in efficiency on the basis of the data acquired through the exergy efficiency value calculation step 120.

The maintenance target identification step S130 may include first, second, and third sub-steps S131, S132, and S133.

The first sub-step S131 of the maintenance target identification step S130 is an operation of detecting an apparatus or subsystem having a data value that is out of a predetermined normal range and of determining the detected apparatus or subsystem as an apparatus or subsystem that needs to be improved in efficiency. The apparatus or subsystem that needs to be improved in efficiency will be referred to as "maintenance target". The second sub-step S132 of the maintenance target identification step S130 is an operation of checking for the maintenance priority of each apparatus and each subsystem. The third sub-step S133 of the maintenance target identification step S130 is an operation of ordering the apparatuses or subsystems that are determined as the maintenance targets in the first sub-step S131 according to the priorities confirmed in the second sub-step S132.

Through the sub-steps S131, S132, and S133 of the maintenance target identification step S130, it is possible to effectively manage each of the apparatuses or subsystems that need to be improved according to the predetermined maintenance priority order.

The maintenance time calculation step S140 refers to an operation of calculating a time at which each apparatus or subsystem is to be maintained or improved on the basis of the data obtained through the exergy efficiency value calculation step 120.

The maintenance target identification step S140 may include fourth, fifth, and sixth sub-steps S141, S142, and S143.

The maintenance time calculation step S140 refers to an operation of estimating a time at which the efficiency of each apparatus or subsystem is expected to be lower than a predetermined efficiency on the basis of each of the exergy efficiency values of various factors, which are derived from data accumulated through the maintenance target identification step 130, thereby determining a time and a cycle on which overall maintenance of each apparatus or system needs to be performed.

The fourth sub-step S141 of the maintenance time calculation step S140 refers to an operation of storing data sorted by date and time. The fifth sub-step S142 of the maintenance time calculation step S140 is an operation of deriving an operation trend curve associated with the operation efficiency of each apparatus or subsystem on the basis of the data acquired in the fourth sub-step S141. The sixth sub-step S143 of the maintenance time calculation step S140 refers to an operation of deriving the maintenance time and the maintenance cycle on which each apparatus or subsystem needs to be maintained on the basis of the results of the fifth sub-step S142.

Through the fourth to sixth sub-steps S141, S142, and S143 of the maintenance time calculation step S140, it is possible to accurately determine the time and cycle on which each apparatus or subsystem needs to be maintained, thereby maximizing the overall operation efficiency of the plant and dramatically reducing the cost of maintenance of the plant.

Depending on conditions, in the plant monitoring method S100 according to an exemplary embodiment, the data detection step S110, the exergy efficiency value calculation step S120, and the maintenance target identification step 130 may be performed again after maintenance for the apparatuses or subsystems determined in the previous maintenance target identification step 130 is performed (operation S150).

In this case, the operation status of each apparatus or subsystem can be continuously monitored.

The plant monitoring method S100 may further include a plant diagnosis result output step S160. The plant diagnosis result output step S160 refers to an operation of notifying a plant operator of the apparatus or subsystem identified in the maintenance target identification step S130 and the calculation results of the maintenance time calculation step S140.

Figure 11:
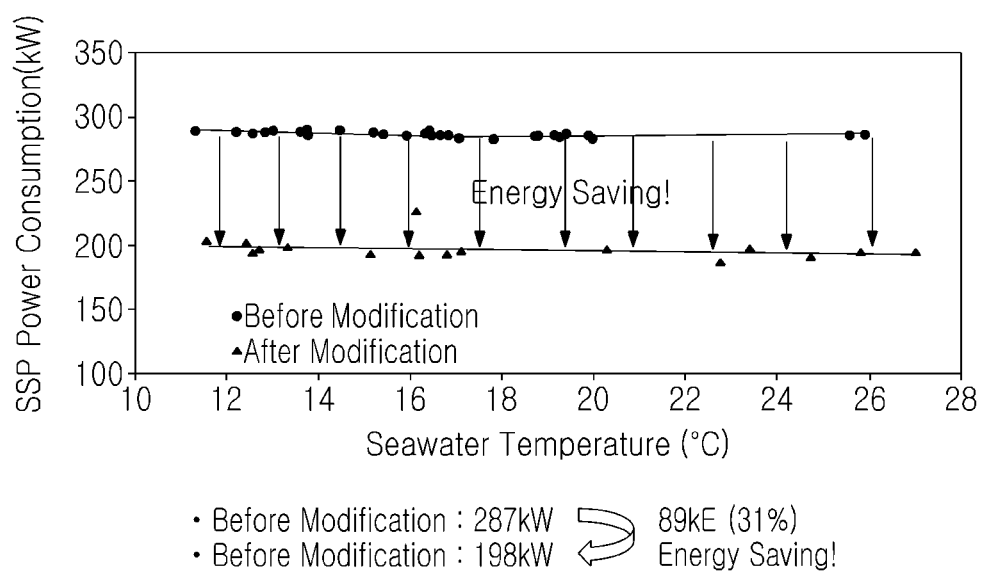
FIG. 11 is a diagram illustrating an energy saving effect obtained by applying a plant monitoring method according to the exemplary embodiment.

FIG. 11 is a diagram showing an energy saving effect obtained by applying the plant monitoring method according to an exemplary embodiment to a plant.

Referring to FIGS. 4, 5, and 11, the plant monitoring method S100 may include the data detection step S110, the exergy efficiency value calculation step S120, the maintenance target identification step S130, and the maintenance time calculation S140. Therefore, the plant monitoring method according to an exemplary embodiment has advantages of solving problems with conventional technologies, checking the status of each apparatus or subsystem constituting a plant, and accurately determining the maintenance time and cycle for each apparatus or subsystem.

As can be seen from FIG. 11, by accurately identifying the apparatuses that need to be improved in efficiency through the plant monitoring method S100 according to the exemplary embodiment, it is possible to remove factor of waste and perform optimum operation, thereby dramatically reducing energy consumption.

As described above, because the plant monitoring method according to the exemplary embodiment includes the data detection step, the exergy efficiency value calculation step, the maintenance target identification step, and the maintenance time calculation, the plant monitoring method has advantages of solving problems with conventional technologies, being capable of checking the status of each apparatus or subsystem constituting a plant, and accurately determining the maintenance time and cycle for each apparatus or subsystem.

Meanwhile, various methods according to an exemplary embodiment described above can be implemented in the form of a readable program through various computer means and recorded in a computer-readable recording medium. Herein, the recording medium can include program commands, data files, data structures, etc. alone or in combination thereof. The program commands to be recorded on the recording medium can be those specially designed and constructed for the present disclosure or can also be those known and available to those skilled in the art of computer software. For example, the recording medium can be magnetic media such as hard disks, floppy disks, and magnetic tapes, optical media such as CD-ROMs and DVDs, magneto-optical media such as floptical disks, and hardware devices specially configured to store and execute the program commands such as ROMs, RAMs, and flash memory. Examples of the program commands can include not only machine language wires such as those produced by a compiler but also high-level language wires that can be executed by a computer by using an interpreter, etc. This hardware device can be configured to operate as one or more software modules in order to perform the operation of the present disclosure, and vice versa.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A method of monitoring an ultra filtration/reverse-osmosis (UF/RO) water plant in which two or more UF/RO membranes are provided, the method comprising:
    detecting, repeatedly, exergy data associated with chemical exergy and physical exergy of each UF/RO membrane, wherein the exergy data is averaged over a predetermined period of time and the predetermined period of time is determined according to a temperature, humidity, precipitation, wind speed, and season in an area in which the two or more UF/RO membranes are installed;
    obtaining a chemical exergy value and a physical exergy value of each UF/RO membrane on the basis of the exergy data;
    calculating an exergy efficiency value of each UF/RO membrane on the basis of the exergy data, wherein the exergy efficiency value of each UF/RO membrane is expressed in terms of a value within a range of 0 to 1, a value within a range of 0 to 10, or a value within a range of 0 to 100;
    identifying an inefficient UF/RO membrane that needs to be improved in efficiency on the basis of data obtained through the calculating of the exergy efficiency value, wherein the determining of the inefficient UF/RO membrane comprises:
        detecting the inefficient UF/RO membrane by checking if the exergy efficiency value of each UF/RO membrane is out of a predetermined range,
        checking a maintenance priority of the two or more UF/RO membranes, and
        ordering the inefficient UF/RO membrane according to the maintenance priority;
    calculating a maintenance time at which the efficiency of the inefficient UF/RO membrane is expected to be lower than a predetermined efficiency using an operation trend curve derived on the basis of the exergy efficiency value; and
    in response to determining of the maintenance time replacing the inefficient UF/RO membrane.

2. The method according to claim 1, further comprising:
    performing again each of the detecting of the exergy data, the calculating of the exergy efficiency value, the identifying of the inefficient UF/RO membrane, and the calculating of the maintenance time after the replacing of the inefficient UF/RO membrane.

3. The method according to claim 1, further comprising:
    outputting a plant diagnosis result to notify a plant operator of the identified inefficient UF/RO membrane and sending a result of the calculated maintenance time at which the inefficient UF/RO membrane is to be replaced to the plant operator.

4. The method according to claim 1, wherein the chemical exergy value is calculated by Equation 1, the physical exergy value is calculated by Equation 2, and a total exergy value is calculated by Equation 3, $$\sum_{i=1}^{n} y_i(\mu_i^* - \mu_i^0) \quad \text{Equation 1}$$

$$\frac{v^2}{2} + g(l - l^*) + (h - h^*) - T_0(s - s^*) \quad \text{Equation 2}$$

$$\frac{v^2}{2} + g(l - l^*) + (h - h^*) - T_0(s - s^*) + \sum_{i=1}^{n} y_i(\mu_i^* - \mu_i^0) \quad \text{Equation 3}$$

where y is a specific mass fraction value, v is a flow velocity value, g is a gravitational acceleration value, M is calculated based on a difference of two chemical potential values, L is calculated based on a difference of two level values, H is calculated based on a difference of two enthalpy values, and S is calculated based on a difference of two entropy values.

5. The method according to claim 1, wherein the chemical exergy value is calculated by Equation 4, the physical exergy value is calculated by Equation 5, and a standard chemical exergy value of a component k is calculated by Equation 6, $$E^{CH} = \Sigma x_k e_k + C\Sigma x_k \ln x_k \quad \text{Equation 4}$$

$$E^{PH} = (U - U_0) + p_0(V - V_0) - S \quad \text{Equation 5}$$

$$e_k^{CH} = -C \ln x_k^e \quad \text{Equation 6}$$

where U and V are internal energy and volume, respectively, a subscript of 0 represents a reference environment, $x_k$ is a molar fraction value of the component k, $x_k^e$ is a molar fraction value of the component k in the reference environment, C is calculated based on a gas constant, and S is calculated based on entropy of the subsystem.

6. The method according to claim 5, wherein the exergy efficiency value is obtained by adding the chemical exergy value and the physical exergy value, and the chemical exergy value includes a mixing exergy value.

7. The method according to claim 1, wherein in the calculating of the exergy efficiency value, if there is a stream for which electric and chemical energy is used or a stream from which electric and chemical energy is generated, the exergy efficiency value is calculated taking into account data associated with the stream.

8. The method according to claim 1, wherein the calculating of the maintenance time comprises:
    storing sorted data sorted by date and time;
    deriving the operation trend curve associated with operation efficiencies of each UF/RQ membrane on the basis of the stored sorted data; and
    deriving a maintenance time and a maintenance cycle on which each UF/RO membrane needs to be replaced on the basis of the derived operation trend curve.

9. The method according to claim 1, wherein the detecting exergy data, the calculating of the exergy efficiency value, and the identifying of the inefficient UF/RO membrane, and the calculating of the maintenance time are periodically performed on a predetermined cycle.

10. A method of monitoring an ultra filtration/reverse osmosis (UF/RO) water plant in which two or more UF/RO membranes are provided, the method comprising:
    detecting, repeatedly, exergy data associated with chemical exergy and physical exergy of each UF/RO membrane, wherein the exergy data is averaged over a predetermined period of time and the predetermined period of time is determined according to a temperature, humidity, precipitation, wind speed, and season in an area in which the two or more UF/RO membranes are installed;
    obtaining a chemical exergy value and a physical exergy value of each UF/RO membrane on the basis of the exergy data;
    calculating an exergy efficiency value of each UF/RO membrane on the basis of the exergy data, wherein the exergy efficiency value of each UF/RO membrane is expressed in terms of a value within a range of 0 to 1, a value within a range of 0 to 10, or a value within a range of 0 to 100;
    identifying an inefficient UF/RO membrane that needs to be improved in efficiency on the basis of data obtained through the calculating of the exergy efficiency value, wherein the determining of the inefficient UF/RO membrane comprises:
        detecting the inefficient UF/RO membrane by checking if the exergy efficiency value of each UF/RO membrane is out of a predetermined range,
        checking a maintenance priority of the two or more UF/RO membranes, and
        ordering the inefficient UF/RO membrane according to the maintenance priority;
    calculating a maintenance time at which each appar subsystem needs the inefficient UF/RO membrane is to be replaced on the basis of the data obtained through the calculating of the exergy efficiency value; and
    performing again each of the detecting of the exergy data, the calculating of the exergy efficiency value, the identifying of the inefficient UF/RO membrane, and the calculating of the maintenance time after replacing the inefficient UF/RO membrane.

11. The method according to claim 10, further comprising:
    outputting a plant diagnosis result to notify a plant operator of the identified inefficient UF/RO membrane and sending a result of the calculated maintenance time at which the inefficient UF/RO membrane is to be replaced to the plant operator.

12. The method according to claim 10, wherein the exergy efficiency value is obtained by adding the chemical exergy value and the physical exergy value, and the chemical exergy value includes a mixing exergy value.

13. The method according to claim 10, wherein in the calculating of the exergy efficiency value, if there is a stream for which electric and chemical energy is used or a stream from which electric and chemical energy is generated, the exergy efficiency value is calculated taking into account data associated with the stream.

14. The method according to claim 10, wherein the calculating of the maintenance time comprises:
    storing sorted data sorted by date and time;
    deriving an operation trend curve associated with operation efficiencies of the two or more UF/RO membranes on the basis of the stored sorted data; and
    deriving a maintenance time and a maintenance cycle on which each UF/RO membrane apparatus of subsystem needs to be maintained replaced on the basis of the derived operation trend curve.

15. The method according to claim 10, wherein the detecting of the exergy data, the calculating of the exergy efficiency value, the identifying of the inefficient UF/RO membrane, and the calculating of the maintenance time are periodically performed on a predetermined cycle.

* * * * *